UNITED STATES PATENT OFFICE.

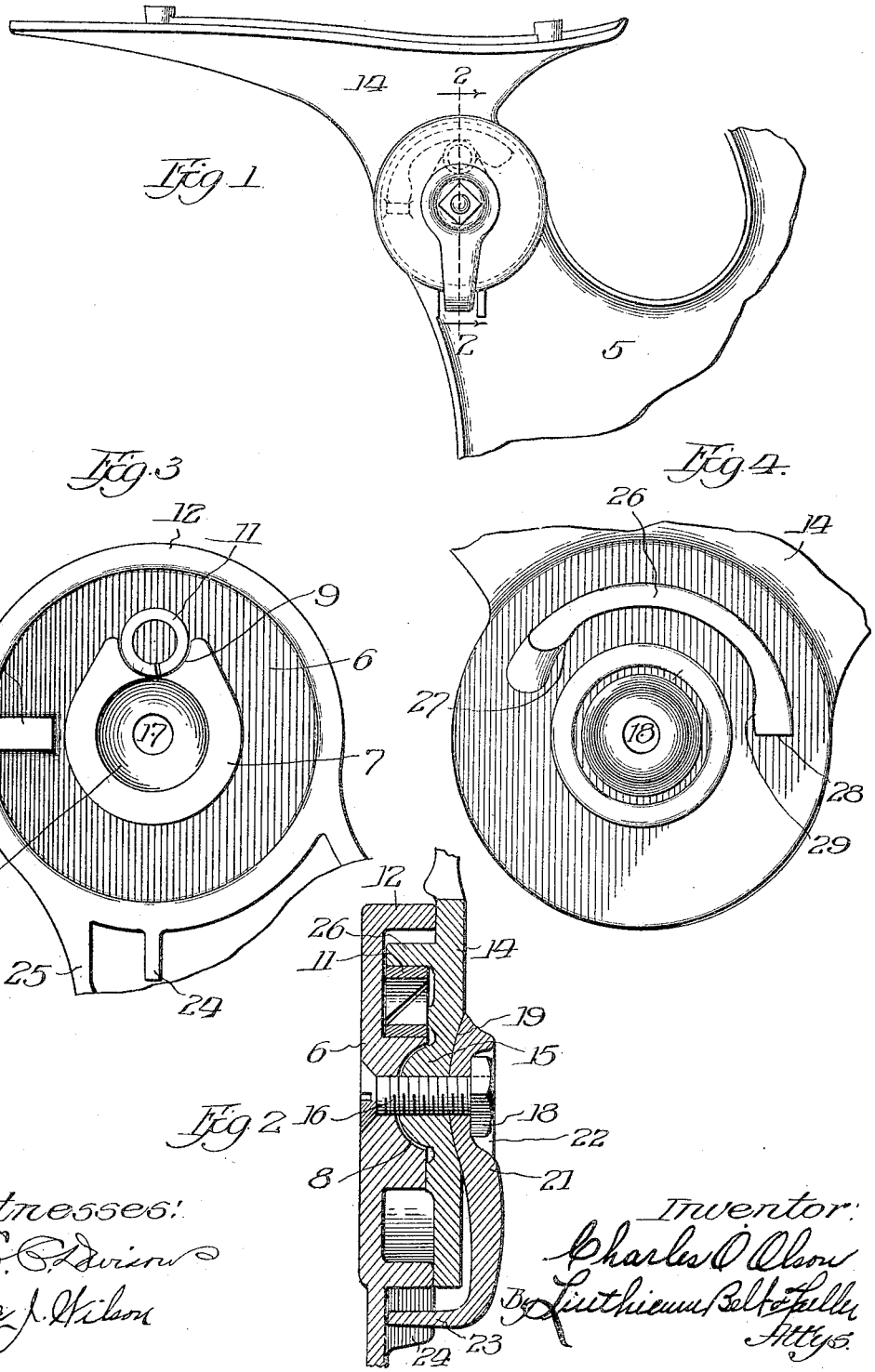

CHARLES O. OLSON, OF CHICAGO, ILLINOIS, ASSIGNOR TO THE A. H. ANDREWS CO., OF CHICAGO, ILLINOIS, A CORPORATION OF ILLINOIS.

SEAT-HINGE.

1,107,440.  Specification of Letters Patent.  Patented Aug. 18, 1914.

Application filed July 2, 1913. Serial No. 776,978.

*To all whom it may concern:*

Be it known that I, CHARLES O. OLSON, a citizen of the United States, and resident of Chicago, in the county of Cook and State of Illinois, have invented certain new and useful Improvements in Seat-Hinges, of which the following is a specification.

This invention relates in general to hinges and more particularly to seat hinges designed to provide a pivotal mounting for the folding seats of school desks, opera chairs, and the like; and one of the primary objects of the invention is the provision of a hinge of this character which will be strong and durable and which will be noiseless in operation.

Another object of the invention is the provision of a hinge of the character above indicated which will be simple in construction and cheap to manufacture, which can be readily assembled and in which the stresses and strains will be so distributed that the liability of breakage or injury to the hinge during operation will be reduced to a minimum.

Other objects and advantages of the invention will be apparent to those skilled in the art as it becomes better understood by reference to the following description when considered in connection with the accompanying drawings.

Referring to the drawings—Figure 1 is a fragmentary elevation looking at the inner face of a seat hinge embodying my invention; Fig. 2 is a sectional view taken on the line 2—2 of Fig. 1; Fig. 3 is an elevation of the stationary member, showing its interior arrangement; and Fig. 4 is a similar view of the movable member.

On the drawings reference character 5 indicates the pedestal of a desk, opera chair, or the like, the upper end 6 of which will be referred to for convenience as the stationary member of the hinge. This member is provided on its inner face with a concentrically disposed laterally projecting boss 7 having at its inner end a circular recess or depression 8 for a purpose to be later described, the boss being provided, preferably at its upper side, with a socket 9 adapted to receive a split-ring spring 11. The stationary member is also provided with a peripheral flange 12 and an abutment 13 disposed between said flange and the boss 7.

The movable member 14, which may be shaped at its upper end to accommodate a seat as shown in Fig. 1, is provided with a raised boss or stud 15 adapted to fit in the depression 8 of the stud 7 as shown in Fig. 2, the movable member being pivotally connected with the stationary member by a screw or bolt 16 passed through the openings 17 and 18 in the bosses of the stationary and movable members, respectively. The movable member is, therefore, adapted to swing about its pivot from the horizontal position shown in Fig. 1 to a substantially vertical position. For the purpose of preventing the nut 18 on the bolt 16 from becoming loosened by the operation of the seat, the outer face of the member 14 is slightly dished as indicated at 19 to receive the complementary face of a locking member 21 provided with a squared socket 22 to receive the nut 18 and having a projecting finger terminating at its extremity in an inward extension 23 disposed between the flanges 24 and 25, respectively, of the stationary member to thereby prevent turning of the nut. The inner face of the movable member is also provided with a segmental inwardly projecting rib 26 adapted to overlie the split-ring 11, the rib being formed concentrically throughout a portion of its length with the pivot aperture 18. One end of the rib, however, is formed on its inner face to provide a cam surface 27 which, as the movable member is swung from vertical to horizontal position, engages with the spring 11 and compresses the same between the cam surface and the boss 7 to thereby yieldingly oppose the final downward movement of the movable member. This yielding opposition or resistance to the downward movement of the movable member permits the movement to take place without shock or noise, the movable member being finally limited by engagement of the end 28 of the rib 26 with the abutment 13. For the purpose of yieldingly resisting the upward movement of the movable member at the end of its stroke to prevent the seat from slamming against the back, the rib 26 is provided adjacent its opposite end with a cam surface 29 which compresses the spring 11 as the seat approaches vertical position.

In assembling the hinge the spring 11 is first placed in the socket 9, the boss or stud 15 of the movable member is then introduced into the depression 8 to aline the openings 17 and 18 and dispose the rib 26 above the spring. The parts are then secured together by the bolt 16, the nut 18 of which is prevented from becoming loosened by the locking member 21. When the seat is lowered from vertical to horizontal position its final movement is yieldingly resisted by the spring 11 which is compressed by the cam surface 27, the downward movement of the seat being limited by engagement of the end 28 of the rib with the abutment 13. Upon upward movement of the seat its final travel is yieldingly opposed by the spring 11 which is then compressed by the cam surface 29.

While I have shown and described only one hinge it will be manifest that two or more hinges of this character will ordinarily be utilized in connection with each seat. For school desks and opera chairs, two hinges, one at each end of the seat, are usually employed.

It is believed that my invention will be readily understood from the foregoing without further description and, while I have shown and described a preferred embodiment of the invention, it will be manifest that various structural changes may be resorted to without departing from the scope of the invention as set forth in the following claim.

I claim:

In a seat hinge, the combination of a stationary supporting member provided on its inner face with a centrally disposed laterally projecting boss provided on its upper periphery with a concave spring-supporting and retaining socket, a movable member pivotally secured to said stationary member concentrically of said boss, said movable member being provided on its inner face with an arcuate rib outside of and opposed to the socket in said central boss, the inner face of said rib at its ends being inclined to provide cam surfaces approaching said boss, and a spring comprising a ring having a diagonally disposed cut positioned in said spring-receiving socket in position to be engaged by the cam surfaces on said arcuate rib as the movable member approaches the limit of its movement in each direction.

CHARLES O. OLSON.

Witnesses:
HENRY J. MERLE,
G. O. BINERS.

---

Copies of this patent may be obtained for five cents each, by addressing the "Commissioner of Patents, Washington, D. C."